US012430871B2

(12) United States Patent
Jia

(10) Patent No.: US 12,430,871 B2
(45) Date of Patent: Sep. 30, 2025

(54) OBJECT ASSOCIATION METHOD AND APPARATUS AND ELECTRONIC DEVICE

(71) Applicant: BEIJING BAIDU NETCOM SCIENCE TECHNOLOGY CO., LTD., Beijing (CN)

(72) Inventor: Lele Jia, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 459 days.

(21) Appl. No.: 17/818,406

(22) Filed: Aug. 9, 2022

(65) Prior Publication Data

US 2022/0383613 A1 Dec. 1, 2022

(30) Foreign Application Priority Data

Jan. 26, 2022 (CN) .......................... 202210094221.4

(51) Int. Cl.
*G06V 10/44* (2022.01)
*G06V 10/46* (2022.01)
(Continued)

(52) U.S. Cl.
CPC ............ *G06V 10/457* (2022.01); *G06V 10/46* (2022.01); *G06V 10/72* (2022.01); *G06V 10/762* (2022.01)

(58) Field of Classification Search
None
See application file for complete search history.

(56) References Cited

U.S. PATENT DOCUMENTS

| 11,378,413 B1* | 7/2022 | Rao ......................... H04W 4/40 |
| 2008/0147660 A1 | 6/2008 | Jarczyk |
| 2019/0371067 A1 | 12/2019 | Simari et al. |

FOREIGN PATENT DOCUMENTS

| CA | 3058785 A1 * | 10/2018 | ............. G06F 16/41 |
| CN | 104063466 A | 9/2014 | |

(Continued)

OTHER PUBLICATIONS

Notification of Grant of Patent Rights for Invention Application of corresponding Chinese Application No. 202210094221.4 dated Dec. 28, 2023, 7 pages.

(Continued)

*Primary Examiner* — Vincent Rudolph
(74) *Attorney, Agent, or Firm* — Tucker Ellis LLP

(57) ABSTRACT

The present disclosure provides an object association method and apparatus, and an electronic device, which relate to the technical field of maps. A specific implementation solution is: when performing object association, extracting first description information of each of a plurality of first objects from real data, and extracting second description information of each of a plurality of second objects from high-definition map data; and determining, according to the first description information and the second description information, association probabilities between the first objects and the second objects; then determining, according to the association probabilities between the first objects and the second objects, an association result of the first objects and the second objects, thus realizing automatic associations between objects in real world and objects in a high-definition map, and improving an association efficiency of objects.

14 Claims, 6 Drawing Sheets

(51) Int. Cl.
*G06V 10/72* (2022.01)
*G06V 10/762* (2022.01)

(56) References Cited

FOREIGN PATENT DOCUMENTS

| CN | 105095306 A | 11/2015 |
|---|---|---|
| CN | 110909671 A | 3/2020 |
| CN | 112069338 A | 12/2020 |
| CN | 112948517 A | 6/2021 |
| CN | 113661531 A | 11/2021 |

OTHER PUBLICATIONS

Office Action of corresponding Chinese Application No. 202210094221.4, dated Sep. 30, 2023, 10 pages.
Ke Wang et al., "Fast feature matching based on r-nearest k-means searching", CAAI Transactions on Intelligence Technology, dated Nov. 20, 2018, 12 pages.
Qin Fu-Gao et al., "Research of Mining Association Rules on Individual Cluster", Computer Knowledge and Technology, vol. 7, No. 14, May 15, 2011, 2 pages.

\* cited by examiner

OBJECT ASSOCIATION METHOD AND APPARATUS AND ELECTRONIC DEVICE

CROSS-REFERENCE TO RELATED APPLICATIONS

This application claims priority to Chinese Patent Application No. 202210094221.4, filed on Jan. 26, 2022, which is hereby incorporated by reference in its entirety.

TECHNICAL FIELD

The present disclosure relates to the field of data processing technology, in particular to the field of map technology, and in particular to an object association method and apparatus, and an electronic device.

BACKGROUND

Associating an object in a lane-level high-definition map with an object in real world is crucial for synchronization between the high-definition map and the real world.

Therefore, how to associate the object in the real world with an object in the high-definition map is an urgent problem for those skilled in the art to solve.

SUMMARY

The present disclosure provides an object association method and apparatus, and an electronic device.

According to a first aspect of the present disclosure, an object association method is provided, and the object association method may include:

extracting first description information of each of a plurality of first objects from real data, and extracting second description information of each of a plurality of second objects from high-definition map data;

determining, according to the first description information and the second description information, association probabilities between the first objects and the second objects;

determining, according to the association probabilities between the first objects and the second objects, an association result of the first objects and the second objects.

According to a second aspect of the present disclosure, an electronic device is provided, including:

at least one processor; and a memory communicatively connected with the at least one processor; where, the memory is stored with instructions executable by the at least one processor, and the instructions are executed by the at least one processor to enable the at least one processor to execute the method described in the first aspect.

According to a third aspect of the present disclosure, a non-transitory computer-readable storage medium stored with computer instructions is provided, where the computer instructions are configured to cause a computer to execute the method described in the first aspect.

It should be understood that the contents described in this part are not intended to identify key or important features of the embodiments of the present disclosure, nor are they intended to limit the scope of the present disclosure. Other features of the present disclosure will be easily understood by the following description.

BRIEF DESCRIPTION OF DRAWINGS

The accompanying drawings are used to better understand solutions, but do not limit the present disclosure. In the accompanying drawings.

DESCRIPTION OF EMBODIMENTS

In the following, exemplary embodiments of the present disclosure are described in combination with the accompanying drawings, in which various details of the embodiments of the present disclosure are included to facilitate understanding, and they shall be considered as merely exemplary. Therefore, those skilled in the art should realize that various changes and modifications can be made to the embodiments described herein without departing from the scope and spirit of the present disclosure. Similarly, for the sake of clarity and conciseness, the description of well-known functions and structures is omitted in the following.

In embodiments of the present disclosure, "at least one" refers to one or more, "a plurality of" refers to two or more. "And/or" describes an access relationship of associated objects, and indicates that there can be three kinds of relationships, for example, A and/or B, which may indicate that there are three cases: A exists alone, A and B at the same time, and B exists alone, in which A and B can be singular or plural. In text description of the present disclosure, the character "/" generally indicates that the front and rear associated objects are in an "or" relationship. In addition, in the embodiments of the present disclosure, "first", "second", "third", "fourth", "fifth" and "sixth" are simply for distinguishing the contents of different objects, and have no other special meanings.

Figure 1:
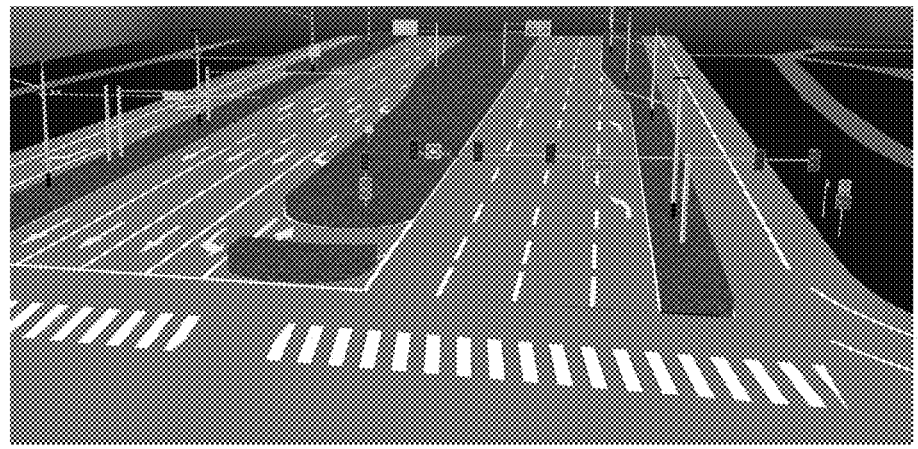
FIG. 1 is a schematic diagram of a road-level high-definition map according to an embodiment of the present disclosure.

The technical solutions provided by embodiments of the present disclosure can be applied to the field of map technology. Taking a road-level high-definition map scenario in the field of map technology as an example, for an example, please refer to FIG. 1. FIG. 1 is a schematic diagram of a road-level high-definition map according to an embodiment of the present disclosure. The road-level high-definition map includes a plurality of objects, such as cameras, signal lights, and other objects. In the road-level high-definition map scenario, if objects in the lane-level high-definition map are associated with objects in the real world, the objects in the real world can be managed based on an object association platform in the road level high-definition map. For example, a camera in the real world corresponding to a camera in the object association platform can be controlled to play its captured video by clicking on the camera in the object association platform; or a status of a camera in the real world corresponding to the acquired camera can be controlled by clicking the camera in the object association platform, such as a maintenance disabled status or a normal status, etc., and the status of the camera is displayed synchronously, in this way, the objects in the real world can be managed effectively. Therefore, how to associate the objects in the real world with the objects in the high-definition map is very important.

At present, when the objects in the real world are associated with the objects in the high-definition map, the association is mainly based on manual annotation. For example, according to a text location description of an object in the real world, first roughly locate an area; then drag a page in a visually rendered high-definition map to find and locate the object, and perform manual association during a whole process, so as to associate the object in the lane level high-definition map with the object in the real world. However, using a manual method to associate the object in the real world with the object in the high-definition map not only makes the cost of manual operation higher, but also leads to low efficiency of object association.

In order to improve the efficiency of object association, first description information of each of a plurality of first objects can be extracted from data in the real world, and second description information of each of a plurality of second objects can be extracted from high-definition map data to determine association probabilities between the first objects and the second objects; the association probability can be used to indicate a degree of association between a first object and a second object, so that an association result of the first object and the second object can be determined according to the association probability between the first object and the second object, thereby realizing automatic associations between the objects in the real world and the objects in the high-definition map, and improving the association efficiency of the objects.

Based on the above technical concept, embodiments of the present disclosure provide an object association method. Next, the object association method provided by the present disclosure will be described in detail by specific embodiments. It can be understood that the following specific embodiments may be combined with each other, and same or similar concepts or processes may not be repeated in some embodiments.

According to the technical solution of the present disclosure, the automatic association between the objects in the real world and the objects in the high-definition map is realized, and the association efficiency of objects is improved.

Embodiment 1

Figure 2:
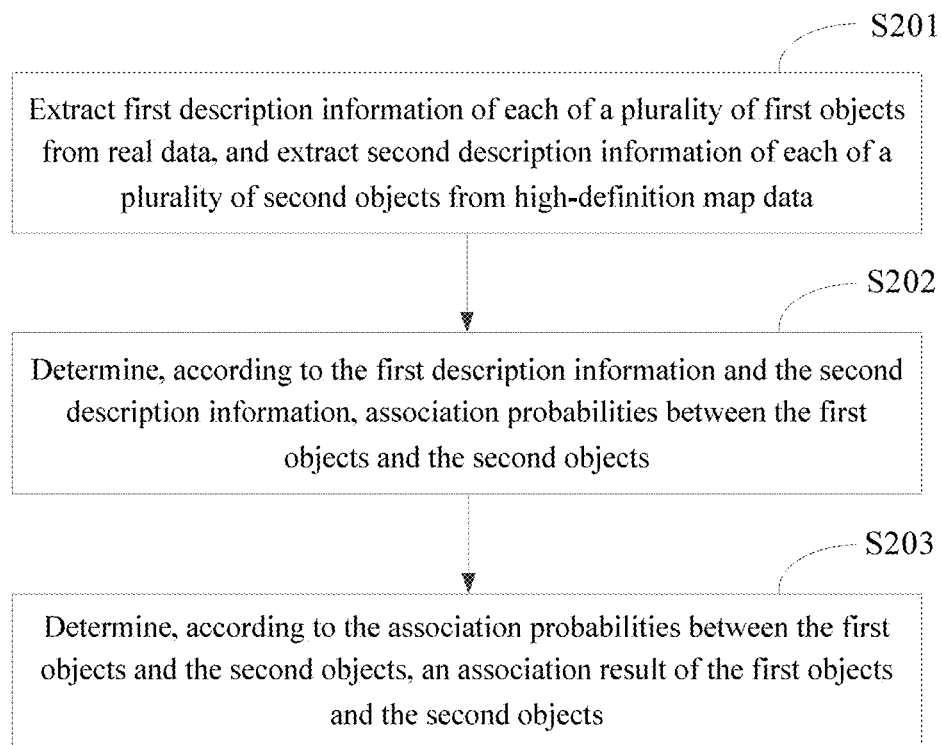
FIG. 2 is a schematic flowchart of an object association method according to a first embodiment of the present disclosure.

FIG. 2 is a schematic flowchart of an object association method according to a first embodiment of the present disclosure. The object association method may be executed by a software and/or hardware apparatus, for example, the hardware apparatus may be a terminal or a server. Exemplarily, please refer to FIG. 2, the object association method may include:

S201, extract first description information of each of a plurality of first objects from real data, and extract second description information of each of a plurality of second objects from high-definition map data.

Real data refers to data in a real world.

It can be understood that in the embodiment of the present disclosure, in order to facilitate a distinction between an object extracted from the real data and an object extracted from the high-definition map data, the object extracted from the real data can be recorded as the first object, and the object extracted from the high-definition map data can be recorded as the second object. Similarly, in order to distinguish, description information of the first object and description information of the second object, the description information of the first object is recorded as the first description information, and the description information of the second object is recorded as the second description information.

Exemplarily, description information may include a location and a type of the object, and may also include other description information of the object, such as an identifier of the object, etc., which may be set according to actual needs. Here, the embodiment of the present disclosure is only described by taking the description information including the location and type of the object as an example, but it does not mean that the embodiment of the present disclosure is limited thereto. Exemplarily, the type of the object may be a type of facilities on a road such as a light pole, a signal light, a sign, a gantry, or a height limit pole, which can be set according to actual needs. Here, the embodiment of the present disclosure does not make specific restrictions on the type of the object.

Exemplarily, the location of the object can be described by at least one kind of coordinate information, such as a point, a line or a surface, which can be set according to an actual scenario. It can be understood that when description is made with reference to a line or a surface, it may also be converted into a point for description.

When using a point to describe a location of an object, for example, the location of the object can be coordinate information recorded during field installation, such as 116.11111, 60.0000; or, the location of the object can be described using the location information of a point of interest (POI), such as an east gate of XX University, which represents the coordinate information of the east gate; when describing the location of the object with a line, the location of the object can be the location information described by a highway station where the object is located, such as Beijing-Tibet highway K20M305, K20M305 represents a location determined on the highway; when describing the location of the object with a surface, the location of the object can be location information described by a urban intersection, such as an intersection of a road A and a road B, which represents coordinate information of a certain intersection in the city, and can be set according to actual needs.

Exemplarily, when extracting the location of the first object from the real data, text description corresponding to the first object can be extracted from the real data firstly, and geographic information can be extracted from the text description of the first object. Then, the extracted geographic information is converted to acquire the location of the first object.

After extracting the first description information of each of the plurality of first objects from the real data and the second description information of each of the plurality of second objects from the high-definition map data, association probabilities between the first objects and the second objects can be determined according to the first description information and the second description information, that is, perform the following S202:

S202, determine, according to the first description information and the second description information, association probabilities between the first objects and the second objects.

The association probability can be used to describe a degree of association between two objects. Generally, a value of an association probability is positively correlated with the degree of association, that is, the higher the degree of association, the larger the value of the corresponding association probability; and the lower the degree of association, the smaller the value of the corresponding association probability.

Since the association probability can be used to describe the degree of association between the two objects, an association result of the first objects and the second objects can be determined according to the association probabilities between the first objects and the second objects, that is, execute the following S203:

S203, determine, according to the association probabilities between the first objects and the second objects, an association result of the first objects and the second objects.

Suppose that the first objects extracted from the real data includes an object 1, an object 2 and an object 3 respectively, and the second objects extracted from the high-definition map data includes an object a, an object b and an object c respectively; and the object 1 in the real world corresponds to the object b in the high-definition map, the object 2 in the real world corresponds to the object a in the high-definition map, and the object 3 in the real world corresponds to the object c in the high-definition map. Then, by calculating the association probabilities between the three first objects and the three second objects, the association result is: the object 1 in the real world is associated with the object b in the high-definition map, the object 2 in the real world is associated with the object a in the high-definition map, and the object 3 in the real world is associated with the object c in the high-definition map.

It can be understood that the above description is only based on the example that the number of the first objects and the number of the second objects are both 3. It is also possible that the number of the first objects and the number of the second objects are not equal due to the problem of the data source. For example, the number of first objects is greater than the number of second objects, then part of the first objects cannot be associated with a second object, that is, there is no second object associated with the part of the first objects, in this case, it can be recorded that an association probability between such first object and the second object is 0.

It can be seen that in the embodiment of the present disclosure, when performing object association, first description information of each of a plurality of first objects can be extracted from real data, and second description information of each of a plurality of second objects can be extracted from high-definition map data firstly; and association probabilities between the first objects and the second objects are determined according to the first description information and the second description information, then an association result of the first objects and the second objects is determined according to the association probabilities between the first objects and the second objects, thus realizing automatic associations between objects in the real world and objects in high-definition maps, and improving an association efficiency of objects.

Based on the embodiment corresponding to the above-mentioned FIG. 2, in order to facilitate understanding how to determine the association probabilities between the first objects and the second objects according to the first description information and the second description information in the above S202, description will be made in the following in detail with reference to a second embodiment shown in FIG. 3 below.

Figure 3:
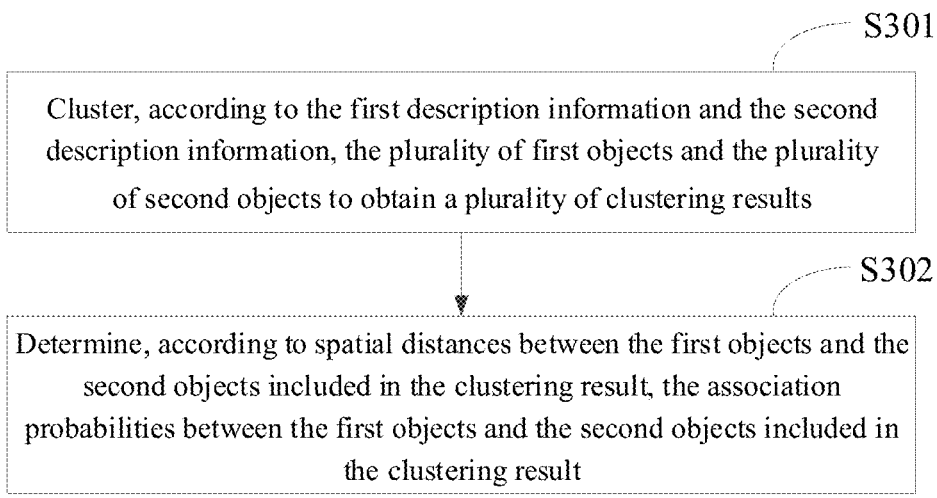
FIG. 3 is a schematic flowchart of a method for determining an association probability between a first object and a second object according to a second embodiment of the present disclosure.

FIG. 3 is a schematic flowchart of a method for determining an association probability between a first object and a second object according to a second embodiment of the present disclosure, and the method can also be executed by a software and/or hardware apparatus. Exemplarily, please refer to FIG. 3, the method may include:

S301, cluster, according to the first description information and the second description information, the plurality of first objects and the plurality of second objects to obtain a plurality of clustering results.

Exemplarily, when the description information includes the location and type of the object, the clustering result includes first objects and second objects with a same type and a spatial distance less than a preset threshold. The value of the preset threshold may be set according to actual needs, and the numbers of the first objects and the second objects may be equal or unequal.

Exemplarily, when clustering the plurality of first objects and the plurality of second objects according to the first description information and the second description information, spatial clustering can be performed on the plurality of first objects and the plurality of second objects according to locations in the first description information and locations in the second description information to obtain a plurality of initial clustering results. The initial clustering includes a plurality of first objects and a plurality of second objects whose spatial distances are less than a distance threshold. Then for the respective initial clustering results, according to respective types of the plurality of first objects and respective types of the plurality of second objects included in the initial clustering results, perform type clustering on the plurality of first objects and the plurality of second objects included in the initial clustering results to obtain the plurality of clustering results.

It should be noted that in the embodiment of the present disclosure, the number of the plurality of first objects and the number of the plurality of second objects included in the initial clustering result can be equal or unequal, which can be set according to actual needs.

Exemplarily, when performing spatial clustering on the plurality of first objects and the plurality of second objects according to locations of the plurality of first objects and locations of the plurality of second objects, it is necessary to first determine distances between objects according to the locations of the plurality of first objects and the locations of the plurality of second objects. Then, the plurality of first objects and the plurality of second objects are spatially clustered according to the distances between objects.

Exemplarily, a distance between objects can be implemented in a number of ways. For example, a distance between points can be calculated by an Euclidean distance; a distance between a point and a line can be calculated by the Euclidean distance between the center point of the point and the line; a distance between a point and a surface can be calculated by the Euclidean distance between the point and the center of gravity of surface; a distance between lines can be calculated by the Euclidean distance between the center point of the line and the center point of another line; a distance between a line and a surface can be calculated by the Euclidean distance between the center point of the line and the center of gravity of the surface; a distance between surfaces can be calculated by the Euclidean distance between the center of gravity of the surface and the center of gravity of another surface etc., which can be set according to actual needs. It does not mean that the embodiments of the present disclosure are limited thereto.

It can be understood that when clustering the plurality of first objects and the plurality of second objects according to the description information, the above example is just an example of clustering according to the locations in the description information first, and then according to the types in the description information; the clustering may also be performed according to the types in the description information first, and then according to the locations in the description information, which can be set according to actual needs.

After clustering according to the locations and types of the objects and obtaining a plurality of clustering results, for the respective clustering results, the association probabilities between the first objects and the second objects can be determined according to spatial distances between the first objects and the second objects included in the clustering results, that is, execute the following S302:

S302, determine, according to spatial distances between the first objects and the second objects included in the clustering result, the association probabilities between the first objects and the second objects included in the clustering result.

The association probability can be used to describe a degree of association between two objects. Generally, a value of an association probability is positively correlated with the degree of association, that is, the higher the degree of association, the larger the value of the corresponding association probability; and the lower the degree of association, the smaller the value of the corresponding association probability.

Exemplarily, when determining the association probabilities between the first objects and the second objects according to the spatial distances between the first objects and the second objects included in the clustering result, a first association probability between the first object and the second object can be determined from a perspective of the first object in the clustering result according to respective spatial distances between the first object and each of the second objects in the clustering result. And a second association probability between the second object and the first object can be determined from a perspective of the second object in the clustering result according to respective spatial distances between the second object and each of the first objects in the clustering result, so that there are two association probabilities between the first object and the second object, and then determine the association probabilities between the first object and the second object based on the two association probabilities.

In order to understand how to determine the first association probability and the second association probability, the following will be described in combination with specific examples. Suppose that m first objects and n second objects are included in a clustering result; in which, m first objects are objects extracted based on real data, and n second objects are objects extracted based on a high-definition map, m is less than n, as shown in Table 1 below:

TABLE 1

| m first objects extracted based on real data | n second objects extracted based on a high-definition map |
| --- | --- |
| real object 1 | model object 1 |
| real object 2 | model object 2 |
| real object 3 | model object 3 |

TABLE 1-continued

| m first objects extracted based on real data | n second objects extracted based on a high-definition map |
| --- | --- |
| real object 4 | model object 4 |
| real object 5 | model object 5 |
| ... | ... |
| real object m | model object m |
| | ... |
| | model object n |

With reference to Table 1, m first objects extracted based on real data can be recorded as a real object 1, a real object 2, a real object 3, . . . , and a real object m; n second objects extracted based on high-definition map can be recorded as a model object 1, a model object 2, . . . , a model object m, . . . , and a model object n.

Figure 4:
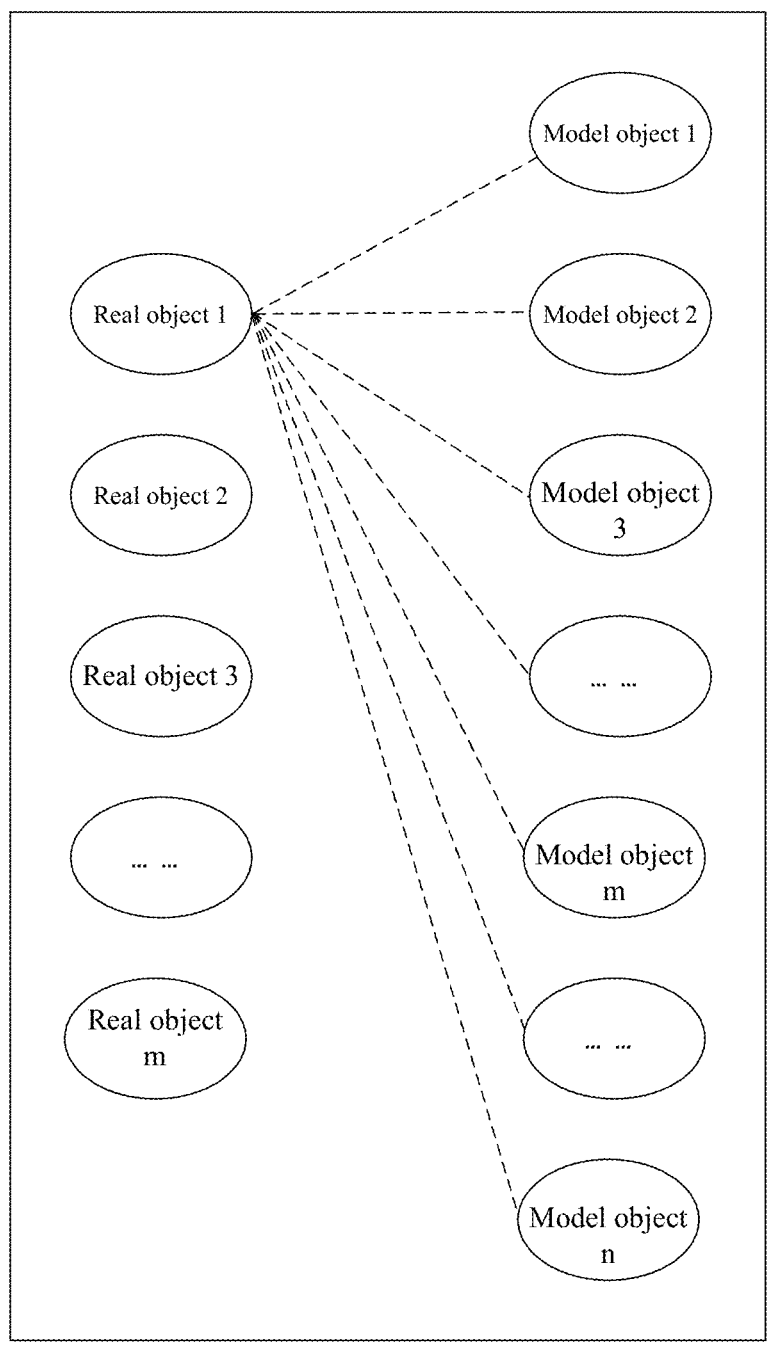
FIG. 4 is a schematic diagram of determining a first association probability according to an embodiment of the present disclosure.

Take the determination of the first association probability between the real object 1 and the model object n, and the determination of the second association probability between the model object n and the real object 1 as an example, when determining the first association probability between the real object 1 and the model object n, exemplarily, as shown in FIG. 4, FIG. 4 is a schematic diagram of determining a first association probability according to an embodiment of the present disclosure. The spatial distances between the real object 1 and each model object of the n model objects can be determined first, and then the first association probability between the real object 1 and the model object n can be determined according to the spatial distances between the real object 1 and each model object of the n model objects. Exemplarily, see the following formula 1:

$$P_{(1,n)} = \frac{e^{dist(1,n)}}{\sum_{j=1}^{n} \left(e^{dist(1,n)}\right)} \quad \text{Formula 1}$$

$P_{(1,n)}$ represents the first association probability between the real object 1 and the model object n, dist(1, n) represents the spatial distance between the real object 1 and the model object n, and j represents the j-th model object in the n model objects. Correspondingly, the first association probability between the real object m and the model object n can be seen in the following formula 2:

$$P_{(m,n)} = \frac{e^{dist(m,n)}}{\sum_{j=1}^{n} \left(e^{dist(m,i)}\right)} \quad \text{Formula 2}$$

$P_{(m,n)}$ represents the first association probability between the real object m and the model object n, dist(m, n) represents the spatial distance between the real object m and the model object n, and j represents the j-th model object among the n model objects.

Figure 5:
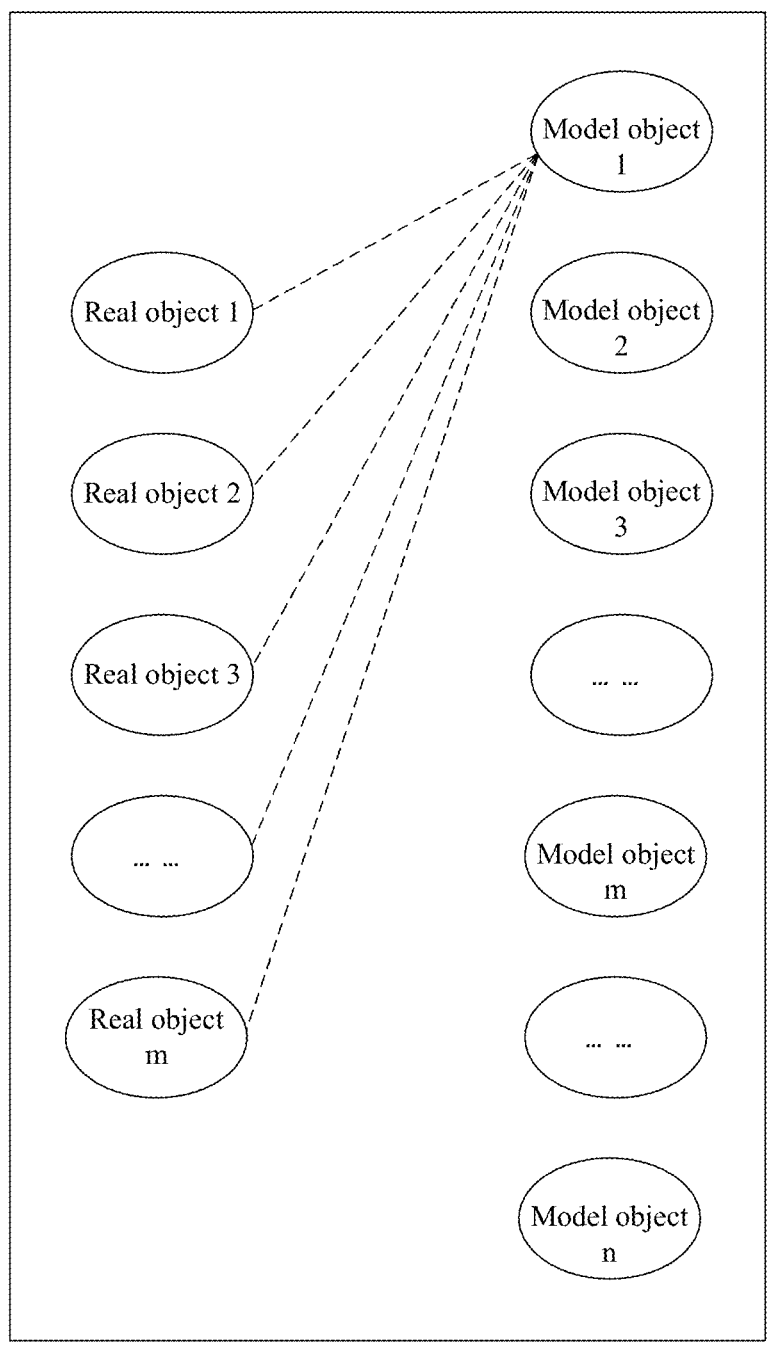
FIG. 5 is a schematic diagram of determining a second association probability according to an embodiment of the present disclosure.

Similar to the above determination of the first association probability between the real object 1 and the model object n, when determining the second association probability between the model object n and the real object 1, exemplarily, as shown in FIG. 5, FIG. 5 is a schematic diagram of determining a second association probability according to an embodiment of the present disclosure. The spatial distances between the model object n and each real object of the m real objects can be determined first, and then the second association probability between the model object n and the real object 1 can be determined according to the spatial distances between the model object n and each real object of the m real objects. Exemplarily, see the following formula 3:

$$Q_{(n,m)} = \frac{e^{dist(n,m)}}{\sum_{i=1}^{m}(e^{dist(n,j)})}$$

Formula 3

$Q_{(n,m)}$ represents the second association probability between the model object n and the real object 1, dist(n, m) represents the spatial distance between the model object n and the real object 1, and i represents the i-th real object among the m real objects.

After determining the first association probability and the second association probability respectively, the association probability between the first object and the second object can be determined according to the first association probability and the second association probability. Exemplarily, according to the first association probability and the second association probability, when determining the association probability between the first object and the second object, a first difference between a preset value and the first association probability may be determined first, and then a second difference between the preset value and the second association probability is determined; a product of the first difference and the second difference is determined; and a third difference between the preset value and the product is determined as the association probability between the first object and the second object.

Continue to take the above-mentioned determination of the association probability between the real object m and the model object n as an example, with reference to the above description, the first association probability between the real object m and the model object n can be recorded as $P_{(m,n)}$, the second association probability between the model object n and the real object 1 is $Q_{(n,m)}$, then the association probability between the real object m and the model object n is determined, see the following formula 4:

$$K_{(m,n)} = 1-(1-P_{(m,n)})(1-Q_{(n,m)})$$

Formula 4

$K_{(m,n)}$ represents the association probability between the real object m and the model object n, so as to acquire the association probability between the real object m and the model object n.

It can be seen that, in the embodiment of the present disclosure, when determining the association probability between the first object and the second object, a plurality of first objects and a plurality of second objects can be clustered according to first description information of each of the plurality of first objects and second description information of each of the plurality of second objects to obtain a plurality of clustering results; and the association probabilities between the first objects and the second objects are determined according to spatial distances between the first objects and the second objects included in the clustering results. In this way, the association probabilities between the first objects and the second objects can be accurately determined, and the accuracy of the association probability is improved.

Based on the above-mentioned embodiment corresponding to FIG. 2 or FIG. 3, in order to facilitate understanding how to determine the association result of the first objects and the second objects according to the association probabilities between the first objects and the second objects in the above-mentioned S203, the following will be described in detail by embodiment 3 shown in FIG. 6 below.

Embodiment 3

Figure 6:
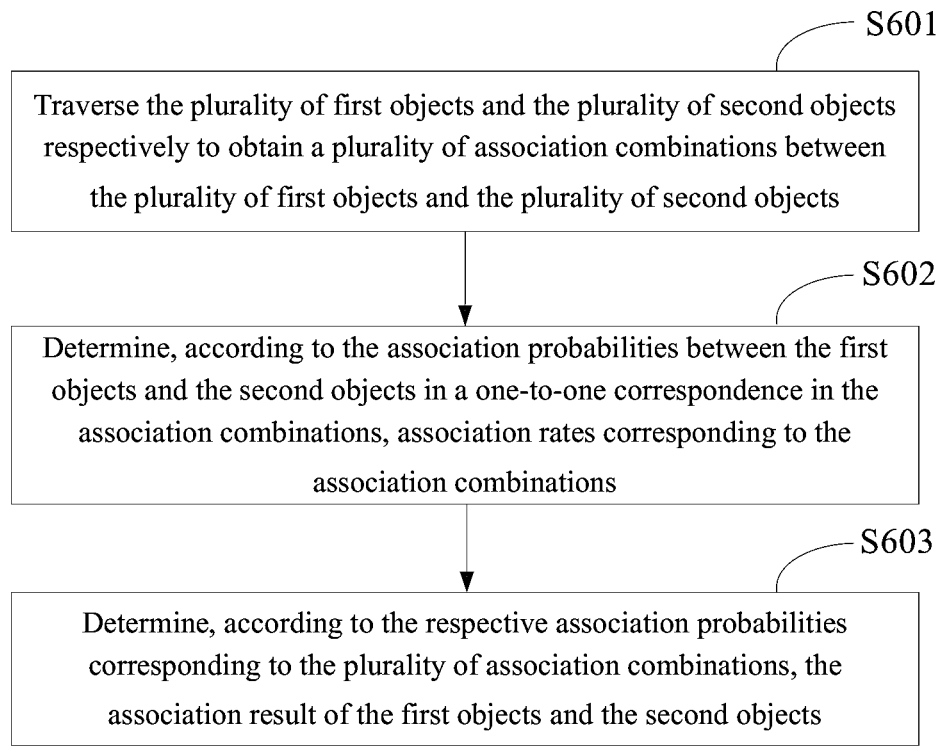
FIG. 6 is a schematic flowchart of a method for determining an association result between first objects and second objects according to a third embodiment of the present disclosure.

FIG. 6 is a schematic flowchart of a method for determining an association result between a first object and a second object according to a third embodiment of the present disclosure, and the method can also be executed by a software and/or hardware apparatus. Exemplarily, please refer to FIG. 6, the method may include:

S601, traverse the plurality of first objects and the plurality of second objects respectively to obtain a plurality of association combinations between the plurality of first objects and the plurality of second objects.

It should be noted that when the number of the first objects and the number of the second objects are equal, the first objects and the second objects correspond one to one in an association combination. When the number of the first objects is greater than the number of the second objects, the association combination includes not only first object(s) and second object(s) which is in a one-to-one correspondence, but also first object(s) which is not successfully matched to a second object, and the association probability between the first object that is not successfully matched to the second object and the second object can be recorded as 0. Similarly, when the number of second objects is greater than the number of first objects, the association combination includes not only first object(s) and second object(s) which is in a one-to-one correspondence, but also second object(s) which is not successfully matched to a first object, and the association probability between the second object that is not successfully matched to the first object and the first object can be recorded as 0.

Exemplarily, assume that a plurality of first objects include a real object 1, a real object 2, and a real object 3, and a plurality of second objects include a model object 1, a model object 2, and a model object 3, then three real objects and three model objects are traversed respectively to obtain all possible association combinations, which are 6 possible association combinations. Exemplarily, an association combination 1 may include the corresponding real object 1 and model object 1, the corresponding real object 2 and model object 2, and the corresponding real object 3 and model object 3; an association combination 2 may include the corresponding real object 1 and model object 1, the corresponding real object 2 and model object 3, and the corresponding real object 3 and model object 2; an association combination 3 may include corresponding the real object 2 and model object 1, the corresponding real object 3 and model object 2, and the corresponding real object 1 and model object 3; an association combination 4 may include the corresponding real object 2 and model object 1, the corresponding real object 1 and model object 2, and the corresponding real object 3 and model object 3; an association combination 5 may include the corresponding real object 3 and model object 1, the corresponding real object 1 and model object 2, and the corresponding real object 2 and model object 3; an association combination 6 may include the corresponding real object 3 and model object 1, the corresponding real object 1 and model object 3, and the corresponding real object 2 and model object 2.

After traversing to obtain a plurality of association combinations between the plurality of first objects and the plurality of second objects, association rates corresponding to the association combinations can be determined according to the association probabilities between the first objects and the second objects which are in a one-to-one correspondence in the respective association combinations, that is, execute the following S602:

S602, determine, according to the association probabilities between the first objects and the second objects in a one-to-one correspondence in the association combinations, association rates corresponding to the association combinations.

When determining the association rate corresponding to the association combination, take the determination of the probability sum corresponding to the above association combination 1 as an example in combination with the description in S601, since the association combination 1 includes the corresponding real object 1 and model object 1, the corresponding real object 2 and model object 2, and the corresponding real object 3 and model object 3, the sum of the association probability between the real object 1 and the model object 1, the association probability between the real object 2 and the model object 2, and the association probability between the real object 3 and the model object 3 can be calculated, and the probability sum is determined as the probability sum corresponding to the association combination 1, so as to obtain the association rate corresponding to each association combination.

S603, determine, according to the respective association probabilities corresponding to the plurality of association combinations, the association result of the first objects and the second objects.

Exemplarily, when determining the association result of the first objects and the second objects according to the association probabilities corresponding to the plurality of association combinations respectively, an association combination corresponding to a maximum association probability can be determined as the association result of the first objects and the second objects. Exemplarily, see the following formula 5:

$$\mathrm{argmax}(\prod_{\substack{0<i<m\\0<j<n}} K_{(i,j)}) \quad \text{Formula 5}$$

i represents the i-th real object among the m real objects, j represents the j-th model object among the n model objects, $K_{(i,j)}$ represents the association probability between the i-th real object and the j-th model object.

Exemplarily, when determining the association result between the first objects and the second objects, in combination with the descriptions of S601 and S602 above, assume that among the 6 association combinations, the association probability corresponding to the association combination 2 is the largest, then the determined association result of the first objects and the second objects is: the real object 1 in the real world is associated with the model object 1 in the high-definition map, the real object 2 in the real world is associated with the model object 3 in the high-definition map, the real object 3 in the real world is associated with the model object 2 in the high-definition map, so as to obtain the association result of the first objects and the second objects.

It can be seen that, in the embodiment of the present disclosure, when determining an association result between the first objects and the second objects, a plurality of first objects and a plurality of second objects can be traversed respectively to obtain a plurality of association combinations between the plurality of first objects and the plurality of second objects; and association rates corresponding to the association combinations can be determined according to the association probabilities between the first objects and the second objects in a one-to-one correspondence in the association combinations; and then the association result of the first objects and the second objects is determined according to the respective association probabilities corresponding to the plurality of association combinations, thereby realizing the automatic association between objects in real world and objects in a high-definition map, and improving an association efficiency of objects.

Embodiment 4

Figure 7:
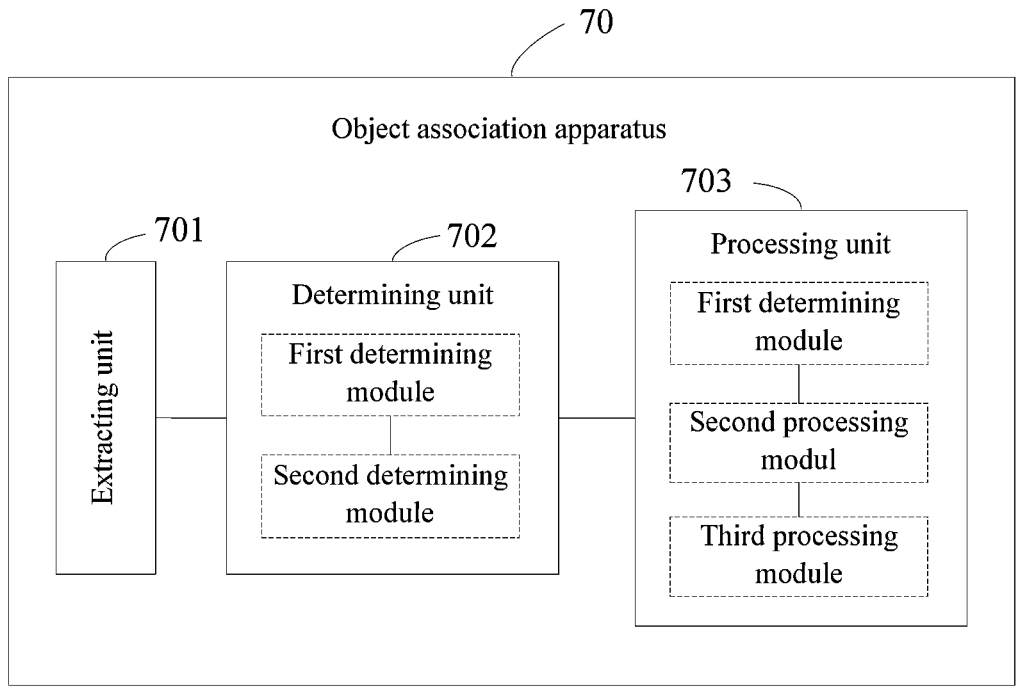
FIG. 7 is a schematic structural diagram of an object association apparatus according to a fourth embodiment of the present disclosure.

FIG. 7 is a schematic structural diagram of an object association apparatus 70 according to a fourth embodiment of the present disclosure. Exemplarily, please refer to FIG. 7, an object association apparatus 70 may include:
- an extracting unit 701, configured to extract first description information of each of a plurality of first objects from real data, and extract second description information of each of a plurality of second objects from high-definition map data;
- a determining unit 702, configured to determine, according to the first description information and the second description information, association probabilities between the first objects and the second objects;
- a processing unit 703, configured to determine, according to the association probabilities between the first objects and the second objects, an association result of the first objects and the second objects.

In an embodiment, the determining unit 702 includes a first determining module and a second determining module;
- the first determining module is configured to cluster, according to the first description information and the second description information, the plurality of first objects and the plurality of second objects to obtain a plurality of clustering results;
- for each of the clustering results, the second determining module is configure to determine, according to spatial distances between the first objects and the second objects included in the clustering result, the association probabilities between the first objects and the second objects included in the clustering result.

In an embodiment, the first determining module includes a first determining sub module and a second determining sub module;
- the first determining sub module is configured to perform, according to locations in the first description information and locations in the second description information, spatial clustering on the plurality of first objects and the plurality of second objects to obtain a plurality of initial clustering results;
- the second determining sub module is configured to perform, according to types in the first description information and types in the second description information, type clustering on the plurality of first objects and the plurality of second objects included in the initial clustering results to obtain the plurality of clustering results.

In an embodiment, the second determining module includes a third determining sub module, a fourth determining sub module and a fifth determining sub module;
- for any first object among the plurality of first objects and any second object among the plurality of second objects:
  the third determining sub module is configured to determine, according to respective spatial distances between the first object and each of the second objects in the clustering result, a first association probability between the first object and the second object;

the fourth determining sub module is configured to determine, according to respective spatial distances between the second object and each of the first objects in the clustering results, a second association probability between the second object and the first object;

the fifth determining sub module is configured to determine, according to the first association probability and the second association probability, the association probability between the first object and the second object included in the clustering result.

In an embodiment, the fifth determining sub module is specifically configured to determine a first difference between a preset value and the first association probability, and determine a second difference between the preset value and the second association probability; determine a product of the first difference and the second difference; and determine a third difference between the preset value and the product as the association probability between the first object and the second object.

In an embodiment, the processing unit 703 includes a first processing module, a second processing module and a third processing module;

the first processing module is configured to traverse the plurality of first objects and the plurality of second objects respectively to obtain a plurality of association combinations between the plurality of first objects and the plurality of second objects;

the second processing module is configured to determine, according to the association probabilities between the first objects and the second objects in a one-to-one correspondence in the association combinations, association rates corresponding to the association combinations;

the third processing module is configured to determine, according to the respective association probabilities corresponding to each of the plurality of association combinations, the association result of the first objects and the second objects.

In an embodiment, the first processing module includes a first processing sub module;

the first processing sub module is configured to determine an association combination corresponding to a maximum association probability as the association result of the first objects and the second objects.

The object association apparatus 70 provided by the embodiment of the present disclosure can implement the technical solution of the object association method shown in any of the above embodiments. Its implementation principle and beneficial effect are similar to the implementation principle and beneficial effect of the object association method, reference can be made to the implementation principle and beneficial effect of the object association method, which will not be repeated here.

According to an embodiment of the present disclosure, the present disclosure further provides an electronic device, a readable storage medium and a computer program product.

According to an embodiment of the present disclosure, the present disclosure further provides a computer program product, the computer program product includes: a computer program, which is stored in a readable storage medium, at least one processor of an electronic device can read the computer program from the readable storage medium, and at least one processor executes the computer program to cause the electronic device to execute the solution provided in any of the above embodiments.

Figure 8:
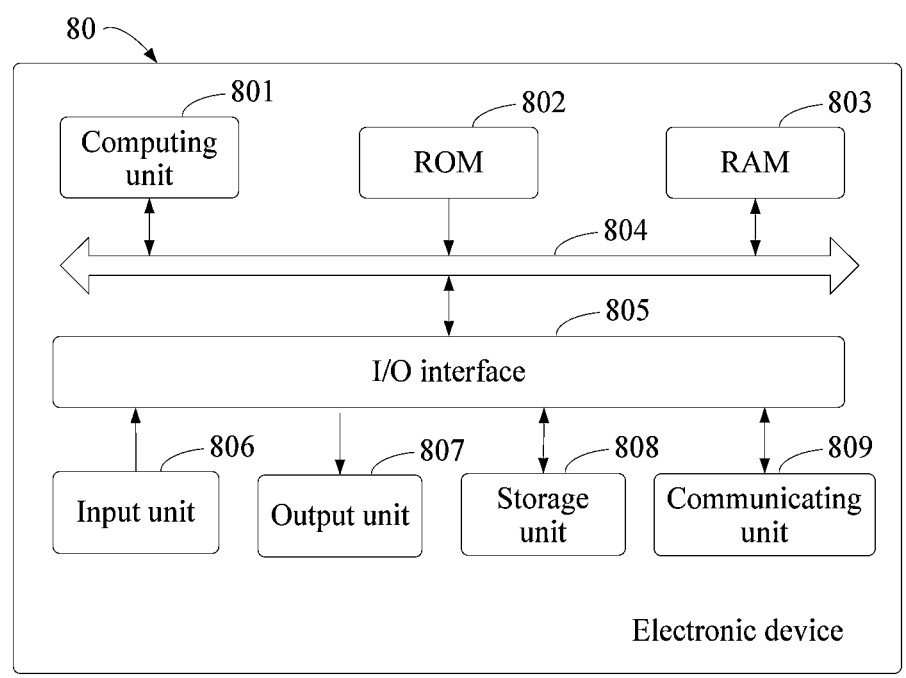
FIG. 8 is a schematic block diagram of an electronic device according to an embodiment of the present disclosure.

FIG. 8 is a schematic block diagram of an electronic device 80 according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

As shown in FIG. 8, the electronic device 80 includes a computing unit 801 that may execute various appropriate actions and arrangements according to a computer program stored in read-only memory (ROM) 802 or a computer program loaded into a random access memory (RAM) 803 from the storage unit 808. In the RAM 803, various programs and data needed for the operation of the device 80 can also be stored. The computing unit 801, ROM 802 and RAM 803 are connected to each other through a bus 804. An input/output (I/O) interface 805 is also connected to the bus 804.

A plurality of components in the device 80 are connected to the I/O interface 805, including: an input unit 806, such as a keyboard, a mouse, etc.; an output unit 807, such as various types of displays, loudspeakers, and the like; a storage unit 808, such as a magnetic disk, an optical disk, etc.; and a communicating unit 809, such as a network card, a modem, a wireless communication transceiver, and the like. The communicating unit 809 allows the device 80 to exchange information/data with other devices through a computer network such as Internet and/or various telecommunication networks.

The computing unit 801 may be a variety of general and/or special processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 801 executes various methods and processes described above, such as the object association method. For example, in some embodiments, the object association method may be implemented as a computer software program that is tangibly contained in a machine-readable medium, such as a storage unit 808. In some embodiments, some or all of the computer programs may be loaded and/or installed on the device 80 via the ROM 802 and/or the communicating unit 809. When the computer program is loaded into the RAM 803 and executed by the computing unit 801, one or more steps of the object association method described above may be executed. Alternatively, in other embodiments, the computing unit 801 may be configured to execute the object association method by any other appropriate means (e.g., by means of firmware).

Various implementations of the systems and technologies described above herein can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor may be a dedicated or general programmable processor, and can receive data and instructions from a storage system, at least one input apparatus, and at least one output apparatus, and transmit data and instructions to the storage system, the at least one input apparatus, and the at least one output apparatus.

Program codes for implementing the method of the present disclosure may be written in any combination of one or more programming languages. These program codes may be provided to a processor or controller of a general computer, a dedicated computer, or other programmable data processing apparatus, so that when the program codes are executed by the processor or controller, the functions/operations specified in the flowchart and/or block diagram are implemented. The program codes can be executed entirely on a machine, partly executed on the machine, partly executed on the machine and partly executed on a remote machine as an independent software package, or entirely on the remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (for example, visual feedback, auditory feedback, or tactile feedback); and the input from the user may be received in any form (including acoustic input, speech input, tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a wide area network (WAN) and Internet.

The computing system may include a client and a server. The client and the server are generally located far away from each other and usually interact with each other through a communication network. A relationship between the client and the server is generated by computer programs running on corresponding computers and having a client-server relationship between each other. The server can be a cloud server, also known as a cloud computing server or a cloud host, and is a host product in a cloud computing business system, which solves shortcomings of traditional physical host and VPS services ("Virtual Private Server", or "VPS" for short) such as difficult management and weak business scalability. The server can also be a distributed system server or a server combined with blockchain.

It should be understood that steps can be reordered, added, or deleted by using the various forms of processes shown above. For example, the steps recited in the present disclosure can be performed in parallel, in sequence or in different orders, as long as expected results of the technical solution disclosed by the present disclosure can be realized, and there is no limitation herein.

The above specific implementations do not limit the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:
1. An object association method, comprising:
  extracting first description information of each of a plurality of first objects from real data, and extracting second description information of each of a plurality of second objects from high-definition map data;
  determining, according to the first description information and the second description information, association probabilities between the first objects and the second objects;
  determining, according to the association probabilities between the first objects and the second objects, an association result of the first objects and the second objects;
  wherein the determining, according to the first description information and the second description information, the association probabilities between the first objects and the second objects comprises:
  clustering, according to the first description information and the second description information, the plurality of first objects and the plurality of second objects to obtain a plurality of clustering results;
  for each of the clustering results, determining, according to spatial distances between the first objects and the second objects comprised in the clustering result, the association probabilities between the first objects and the second objects comprised in the clustering result;

wherein the clustering, according to the first description information and the second description information, the plurality of first objects and the plurality of second objects to obtain the plurality of clustering results comprises:
performing, according to locations in the first description information and locations in the second description information, spatial clustering on the plurality of first objects and the plurality of second objects to obtain a plurality of initial clustering results;
performing, according to types in the first description information and types in the second description information, type clustering on the plurality of first objects and the plurality of second objects comprised in the initial clustering results to obtain the plurality of clustering results.

2. The method according to claim 1, wherein for each of the clustering results, the determining, according to spatial distances between the first objects and the second objects comprised in the clustering results, the association probabilities between the first objects and the second objects comprised in the clustering result comprises:
for any first object among the plurality of first objects and any second object among the plurality of second objects:
determining, according to respective spatial distances between the first object and each of the second objects in the clustering result, a first association probability between the first object and the second object;
determining, according to respective spatial distances between the second object and each of the first objects in the clustering result, a second association probability between the second object and the first object;
determining, according to the first association probability and the second association probability, the association probability between the first object and the second object comprised in the clustering result.

3. The method according to claim 2, wherein the determining, according to the association probabilities between the first objects and the second objects, the association result of the first objects and the second objects comprises:
traversing the plurality of first objects and the plurality of second objects respectively to obtain a plurality of association combinations between the plurality of first objects and the plurality of second objects;
determining, according to the association probabilities between the first objects and the second objects in a one-to-one correspondence in the association combinations, association rates corresponding to the association combinations;
determining, according to the respective association probabilities corresponding to the plurality of association combinations, the association result of the first objects and the second objects.

4. The method according to claim 2, wherein the determining, according to the first association probability and the second association probability, the association probability between the first object and the second object comprises:
determining a first difference between a preset value and the first association probability, and determining a second difference between the preset value and the second association probability;
determining a product of the first difference and the second difference;
determining a third difference between the preset value and the product as the association probability between the first object and the second object.

5. The method according to claim 4, wherein the determining, according to the association probabilities between the first objects and the second objects, the association result of the first objects and the second objects comprises:
traversing the plurality of first objects and the plurality of second objects respectively to obtain a plurality of association combinations between the plurality of first objects and the plurality of second objects;
determining, according to the association probabilities between the first objects and the second objects in a one-to-one correspondence in the association combinations, association rates corresponding to the association combinations;
determining, according to the respective association probabilities corresponding to the plurality of association combinations, the association result of the first objects and the second objects.

6. The method according to claim 1, wherein the determining, according to the association probabilities between the first objects and the second objects, the association result of the first objects and the second objects comprises:
traversing the plurality of first objects and the plurality of second objects respectively to obtain a plurality of association combinations between the plurality of first objects and the plurality of second objects;
determining, according to the association probabilities between the first objects and the second objects in a one-to-one correspondence in the association combinations, association rates corresponding to the association combinations;
determining, according to the respective association probabilities corresponding to the plurality of association combinations, the association result of the first objects and the second objects.

7. The method according to claim 6, wherein the determining, according to the respective association probabilities corresponding to the plurality of association combinations, the association result of the first objects and the second objects comprises:
determining an association combination corresponding to a maximum association probability as the association result of the first objects and the second objects.

8. The method according to claim 1, wherein for each of the clustering results, the determining, according to spatial distances between the first objects and the second objects comprised in the clustering results, the association probabilities between the first objects and the second objects comprised in the clustering result comprises:
for any first object among the plurality of first objects and any second object among the plurality of second objects:
determining, according to respective spatial distances between the first object and each of the second objects in the clustering result, a first association probability between the first object and the second object;
determining, according to respective spatial distances between the second object and each of the first objects in the clustering result, a second association probability between the second object and the first object;
determining, according to the first association probability and the second association probability, the association probability between the first object and the second object comprised in the clustering result.

9. An object association apparatus, comprising:
at least one processor; and
a memory communicatively connected to the at least one processor; wherein,

19 the memory stores instructions executable by the at least one processor, and the instructions are executed by the at least one processor, so that the at least one processor is configured to:

extract first description information of each of a plurality of first objects from real data, and extract second description information of each of a plurality of second objects from high-definition map data;

determine, according to the first description information and the second description information, association probabilities between the first objects and the second objects;

determine, according to the association probabilities between the first objects and the second objects, an association result of the first objects and the second objects;

wherein the at least one processor is further configured to:

cluster, according to the first description information and the second description information, the plurality of first objects and the plurality of second objects to obtain a plurality of clustering results;

for each of the clustering results, determine, according to spatial distances between the first objects and the second objects comprised in the clustering result, the association probabilities between the first objects and the second objects comprised in the clustering result;

wherein the at least one processor is further configured to:

perform, according to locations in the first description information and locations in the second description information, spatial clustering on the plurality of first objects and the plurality of second objects to obtain a plurality of initial clustering results;

perform, according to types in the first description information and types in the second description information, type clustering on the plurality of first objects and the plurality of second objects comprised in the initial clustering results to obtain the plurality of clustering results.

10. The apparatus according to claim 9, wherein the at least one processor is further configured to:

for any first object among the plurality of first objects and any second object among the plurality of second objects:

determine, according to respective spatial distances between the first object and each of second objects in the clustering results, a first association probability between the first object and the second object;

determine, according to respective spatial distances between the second object and each of the first objects in the clustering results, a second association probability between the second object and the first object;

determine, according to the first association probability and the second association probability, the association probability between the first object and the second object comprised in the clustering result.

11. The apparatus according to claim 10, wherein the at least one processor is further configured to:

determine a first difference between a preset value and the first association probability, and determine a second difference between the preset value and the second association probability; determine a product of the first difference and the second difference; and determine a third difference between the preset value and the product as the association probability between the first object and the second object.

20

12. The apparatus according to claim 9, wherein the at least one processor is further configured to:

traverse the plurality of first objects and the plurality of second objects respectively to obtain a plurality of association combinations between the plurality of first objects and the plurality of second objects;

determine, according to the association probabilities between the first objects and the second objects in a one-to-one correspondence in the association combinations, association rates corresponding to the association combinations;

determine, according to the respective association probabilities corresponding to the plurality of association combinations, the association result of the first objects and the second objects.

13. The apparatus according to claim 12, wherein the at least one processor is further configured to:

determine an association combination corresponding to a maximum association probability as the association result of the first objects and the second objects.

14. A non-transitory computer-readable storage medium stored with computer instructions, wherein the computer instructions are configured to enable a computer to execute steps of:

extracting first description information of each of a plurality of first objects from real data, and extracting second description information of each of a plurality of second objects from high-definition map data;

determining, according to the first description information and the second description information, association probabilities between the first objects and the second objects;

determining, according to the association probabilities between the first objects and the second objects, an association result of the first objects and the second objects;

wherein the determining, according to the first description information and the second description information, the association probabilities between the first objects and the second objects comprises:

clustering, according to the first description information and the second description information, the plurality of first objects and the plurality of second objects to obtain a plurality of clustering results;

for each of the clustering results, determining, according to spatial distances between the first objects and the second objects comprised in the clustering result, the association probabilities between the first objects and the second objects comprised in the clustering result;

wherein the clustering, according to the first description information and the second description information, the plurality of first objects and the plurality of second objects to obtain the plurality of clustering results comprises:

performing, according to locations in the first description information and locations in the second description information, spatial clustering on the plurality of first objects and the plurality of second objects to obtain a plurality of initial clustering results;

performing, according to types in the first description information and types in the second description information, type clustering on the plurality of first objects and the plurality of second objects comprised in the initial clustering results to obtain the plurality of clustering results.

* * * * *